US008225274B2

(12) United States Patent
Cowtan

(10) Patent No.: US 8,225,274 B2
(45) Date of Patent: Jul. 17, 2012

(54) CODE HIGHLIGHT AND INTELLIGENT LOCATION DESCRIPTOR FOR PROGRAMMING SHELLS

(75) Inventor: Mark Gregory Cowtan, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1505 days.

(21) Appl. No.: 11/695,748

(22) Filed: Apr. 3, 2007

(65) Prior Publication Data
US 2007/0240107 A1    Oct. 11, 2007

(30) Foreign Application Priority Data

Apr. 11, 2006  (CA) ........................... 2543304

(51) Int. Cl.
*G06F 9/44* (2006.01)
(52) U.S. Cl. ........ 717/105; 717/109; 717/113; 717/123; 715/230; 715/705; 715/854
(58) Field of Classification Search .................. None
See application file for complete search history.

(56) References Cited

U.S. PATENT DOCUMENTS

| | | | | | |
|---|---|---|---|---|---|
| 4,853,878 | A | * | 8/1989 | Brown | 715/202 |
| 5,317,684 | A | * | 5/1994 | Penna | 345/467 |
| 5,710,899 | A | * | 1/1998 | Eick | 715/764 |
| 5,726,680 | A | * | 3/1998 | Paley et al. | 345/589 |
| 5,748,955 | A | * | 5/1998 | Smith | 707/693 |
| 5,905,521 | A | * | 5/1999 | Gatto et al. | 725/95 |
| 6,031,626 | A | * | 2/2000 | Shu et al. | 358/1.9 |
| 6,125,375 | A | * | 9/2000 | Atkins et al. | 715/207 |
| 6,178,430 | B1 | * | 1/2001 | Cohen et al. | 715/273 |
| 6,272,508 | B1 | * | 8/2001 | Dyne et al. | 715/210 |
| 6,408,430 | B2 | | 6/2002 | Gunter et al. | |
| 6,691,301 | B2 | * | 2/2004 | Bowen | 717/114 |
| 6,724,401 | B1 | | 4/2004 | Hunnum et al. | |
| 6,931,625 | B1 | | 8/2005 | Coad et al. | |
| 7,030,890 | B1 | * | 4/2006 | Jouet et al. | 345/619 |
| 7,080,360 | B2 | * | 7/2006 | Bates et al. | 717/129 |
| 7,474,288 | B2 | * | 1/2009 | Smith et al. | 345/83 |
| 7,634,454 | B2 | * | 12/2009 | Venolia et al. | 1/1 |
| 7,844,987 | B2 | * | 11/2010 | Kelts | 725/44 |
| 8,117,593 | B1 | * | 2/2012 | Freeman | 717/113 |

(Continued)

OTHER PUBLICATIONS

Title: Visual Debugging, author: Crossno, P et al, source: IEEE, dated:Dec. 10, 2002.*

*Primary Examiner* — Chameli Das
(74) *Attorney, Agent, or Firm* — Schmeiser, Olsen & Watts; John Pivnichny

(57) ABSTRACT

There are disclosed systems and methods for aiding programmers in identifying a location in a program while coding. In an embodiment, the method comprises defining a plurality of sections of code within the program, associating at least one section of code with a background color, and displaying the at least one section of code against the associated background color. Sections of code corresponding to the same module may be associated with the same background color. A user-selectable control may be provided for viewing only those sections of code corresponding to a user-selected module, and upon selection of the module by the user, only those sections of code corresponding to the module may be displayed against the associated background color. A text description may also be associated with each section of code, and the text description may be displayed when a cursor is placed in the section of code.

17 Claims, 6 Drawing Sheets

U.S. PATENT DOCUMENTS

| | | | |
|---|---|---|---|
| 2002/0023257 A1* | 2/2002 | Charisius et al. | 717/2 |
| 2003/0115576 A1* | 6/2003 | Bates et al. | 717/129 |
| 2003/0145310 A1* | 7/2003 | Thames et al. | 717/123 |
| 2004/0006765 A1* | 1/2004 | Goldman | 717/116 |
| 2004/0128649 A1 | 7/2004 | Grundy et al. | |
| 2004/0153995 A1 | 8/2004 | Polonovski | |
| 2004/0172623 A1 | 9/2004 | Eckels et al. | |
| 2006/0064716 A1* | 3/2006 | Sull et al. | 725/37 |
| 2007/0074195 A1* | 3/2007 | Liao et al. | 717/160 |
| 2008/0120269 A1* | 5/2008 | Venolia et al. | 707/1 |
| 2010/0174717 A1* | 7/2010 | Fambon et al. | 707/741 |
| 2010/0325571 A1* | 12/2010 | Kodosky et al. | 715/772 |

* cited by examiner

CODE HIGHLIGHT AND INTELLIGENT LOCATION DESCRIPTOR FOR PROGRAMMING SHELLS

CROSS-REFERENCE TO RELATED APPLICATION

This application claims the priority benefit of Canadian Patent Application No. CA 2543304 filed Nov. 4, 2006, and entitled CODE HIGHLIGHT AND INTELLIGENT LOCATION DESCRIPTOR FOR PROGRAMMING SHELLS.

FIELD OF THE INVENTION

The present invention relates to programming aids, and more specifically to systems and methods for aiding programmers in identifying their location while coding.

BACKGROUND OF THE INVENTION

When programming in text in a conventional manner in any one of a number of different languages, programmers may sometimes lose their bearings while coding. For example, a programmer may find that in the middle of a large block of code, block relationships and logic statements may be forgotten. This may result in errors in logic later discovered during attempted compilation, potentially requiring extensive rework to correct. Worse, the errors in logic may get compiled and result in a program that functions incorrectly. Improved systems and methods are needed.

SUMMARY OF THE INVENTION

An objective of the present invention is to provide programming aids, such as systems and methods for aiding programmers in identifying a location while coding.

According to one aspect of the invention, there is provided a method for aiding programmers in identifying a location in a program while coding, comprising defining a plurality of sections of code within the program, associating at least one section of the plurality of sections of code with a background colour, and displaying the at least one section of the code against the associated background colour.

According to another aspect of the invention, there is provided a system for aiding programmers in identifying a location in a program while coding, comprising means for defining a plurality of sections of code within the program, means for associating at least one section of the plurality of sections of code with a background colour, and means for displaying the at least one section of the code against the associated background colour.

In yet another aspect of the invention, there is provided a data processor readable medium storing data processor code that, when loaded into a data processing device, adapts the device to aid programmers in identifying a location in a program while coding, the data processor readable medium including, code for defining a plurality of sections of code within the program, code for associating at least one section of the plurality of sections of code with a background colour, and code for displaying the at least one section of the code against the associated background colour.

These and other aspects of the invention will become apparent from the following more particular descriptions of exemplary embodiments.

DETAILED DESCRIPTION OF THE INVENTION

As noted above, the present invention relates to programming aids, and more specifically to systems and methods for aiding programmers in identifying their location while coding.

Figure 1:
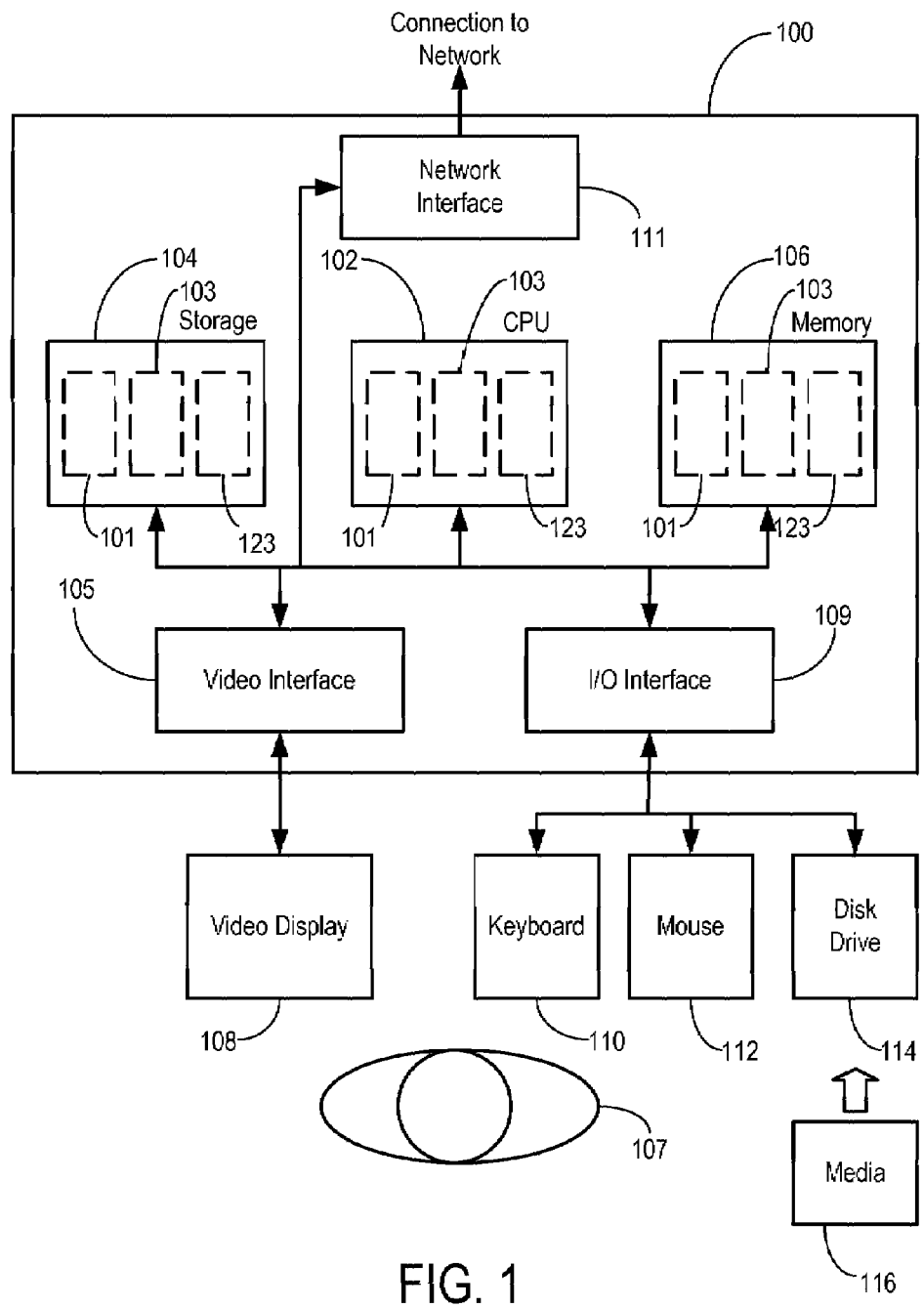
FIG. 1 shows a generic data processing system that may provide a suitable operating environment.

The invention may be practiced in various embodiments. A suitably configured data processing system, and associated communications networks, devices, software and firmware may provide a platform for enabling the invention. By way of example, FIG. 1 shows a generic data processing system 100 that may include a central processing unit (CPU) 102 connected to a storage unit 104 and to a random access memory 106. CPU 102 may process an operating system 101, an application program 103, and data 123. Operating system 101, application program 103, and data 123 may be stored in storage unit 104 and loaded into memory 106, as may be required. An operator 107 may interact with data processing system 100 using a video display 108 connected by a video interface 105, and various input/output devices such as a keyboard 110, a mouse 112, and a disk drive 114 connected by an I/O interface 109. In known manner, mouse 112 may be configured to control movement of a cursor in video display 108, and to operate various graphical user interface (GUI) controls appearing in the video display with a mouse button. Disk drive 114 may be configured to accept a data processing system readable media 116. Data processing system 100 may form part of a network via a network interface 111, allowing data processing system 100 to communicate with other suitably configured data processing systems (not shown). The particular configurations shown by way of example in this specification are not meant to be limiting.

Figure 2:
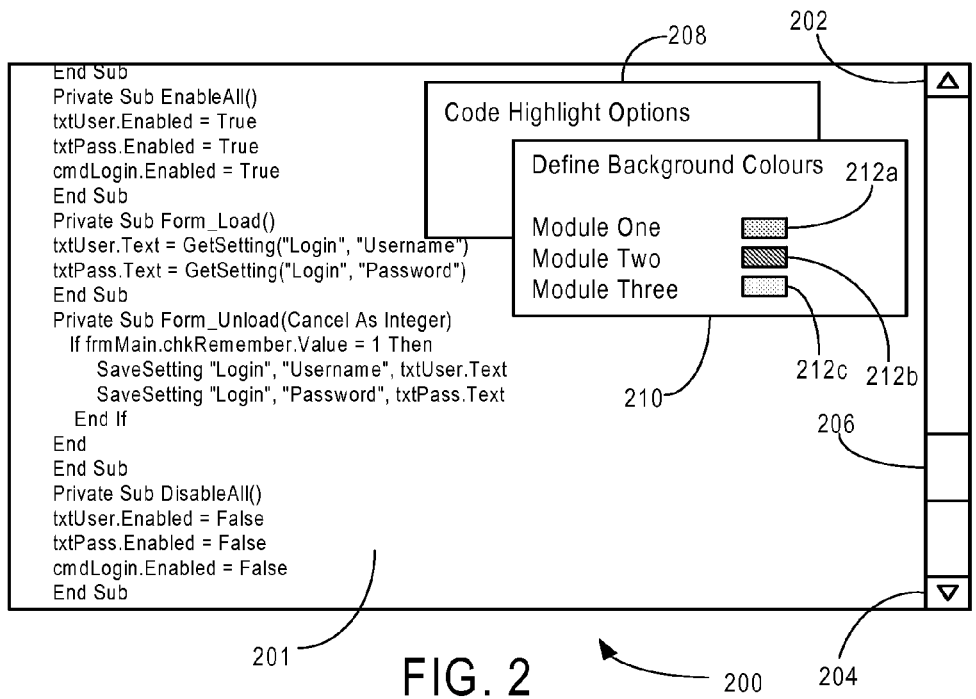
FIGS. 2 to 7 show illustrative graphical user interface (GUI) screens that may be provided in a compiler shell in accordance with various embodiments of the invention.

Referring to FIG. 2, shown is an illustrative GUI screen 200 that may be found within a compiler shell that may be running on data processing system 100. GUI screen 200 may be shown on video display 108 and include a scrollable window 201 that allows a user to see a small section of code in the window at any one time. Window 201 is scrollable using up and down scroll controls 202 and 204, or by dragging a scroll bar 206 up or down the right column. As shown, pop-up windows 208 and 210 may appear within GUI screen 200 by hitting a key on keyboard 110 or clicking a button on mouse 112. In this illustrative example, pop-up window 208 may provide the user with a number of selectable options, including an option to define background colours as shown in pop-up window 210.

Pop-up window 210 may provide a list of code modules for which a user would like to define background colours. These code modules may relate to different types of operational tasks in the code, for example. As another example, these modules may be defined as different levels of code within a hierarchy (e.g. the highlighting of logical blocks of code, such as "if" blocks and "select case" blocks). In this illustrative example, pop-up window 210 shows a list of three modules—a module one, a module two, and a module three—with three different assigned background colours 212a, 212b, and 212c respectively.

Figure 3:
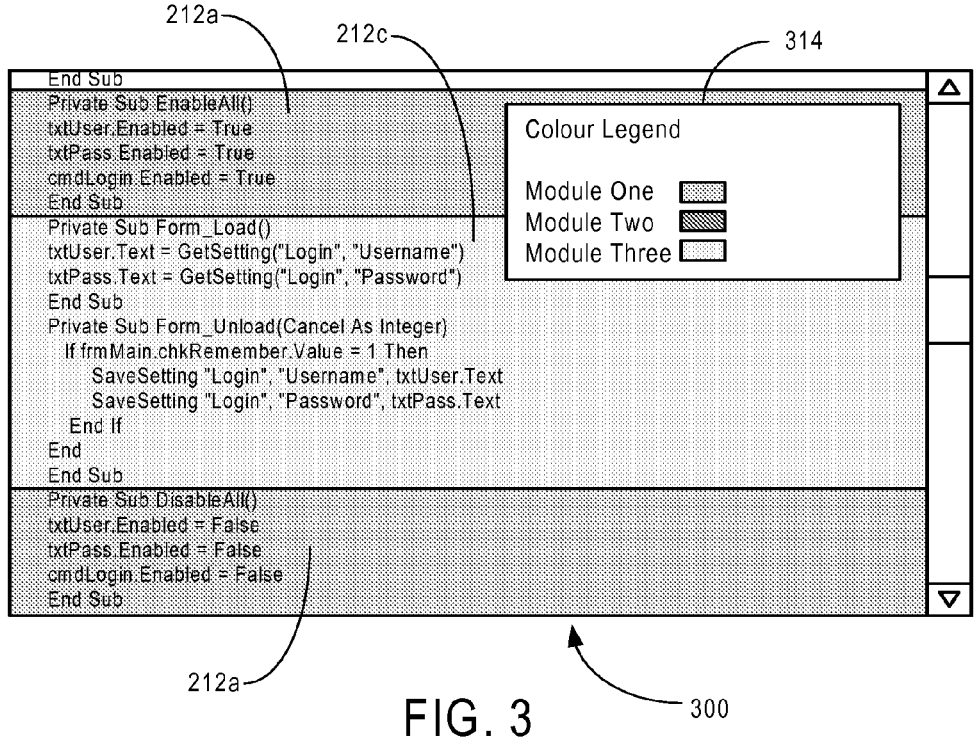

Referring to FIG. 3, shown is a GUI screen 300 with code that has been highlighted with different background colours. The colour of each line of code may be defined by a background colour field associated with or defined for each line in the code editor. For example, the code that was shown unmarked in FIG. 2 is now segmented into a plurality of bands of different colours. Portions of code associated with module one may be shown with background colour 212a corresponding to the colour previously assigned to module one in FIG. 2. Similarly, a portion of code associated with module three may be shown with background colour 212c corresponding to the colour previously assigned to module three in FIG. 2. To quickly identify which colours correspond to which modules, a legend 314 may be shown indicating the colour assigned to each module.

Figure 4:
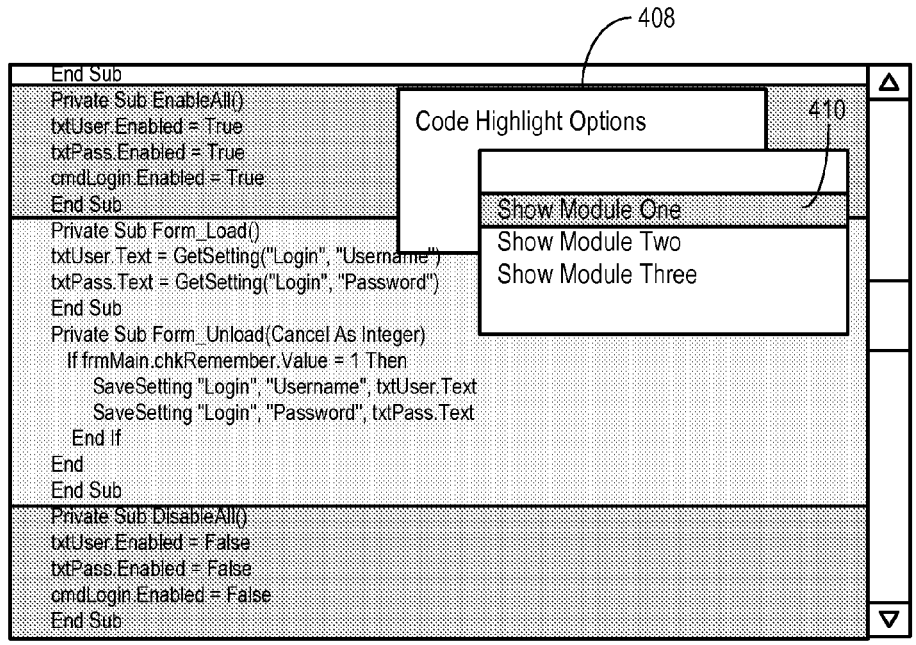

Referring to FIG. 4, shown is another GUI screen 400 in which two pop-up windows 408 and 410 are shown. Pop-up window 408 may configured similarly to pop-up window 208 of FIG. 2 and may be used for selecting various code viewing options. In this illustrative example, pop-up window 410 lists three options for displaying different modules in the window: "Show Module One", "Show Module Two", and "Show Module Three". Module one is selected and shown highlighted in pop-up window 410.

Figure 5:
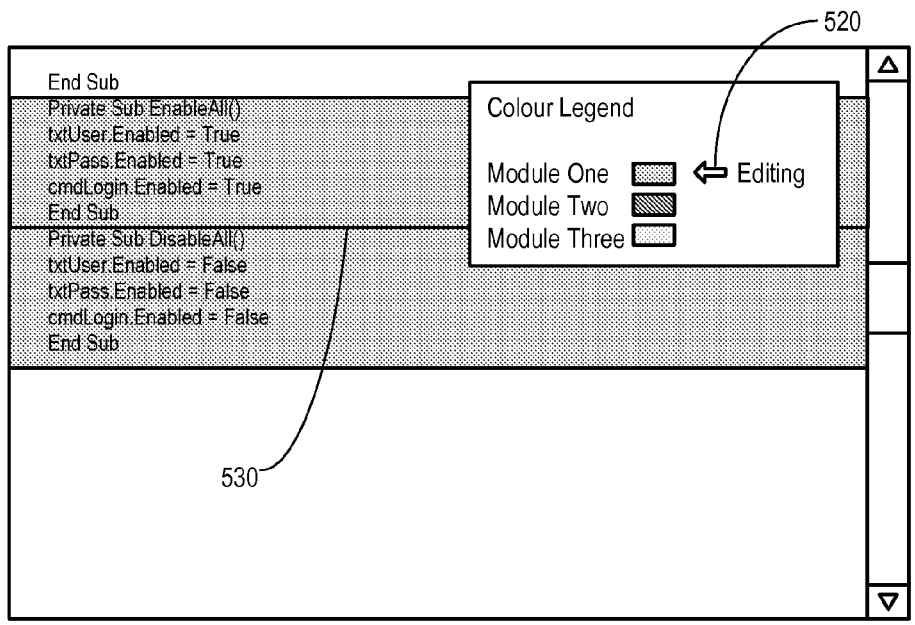

Referring to FIG. 5, a GUI screen 500 shows the results of selecting the "Show Module One" option in pop-up window 410. Namely, code associated with module three previously shown in FIG. 4 has now been removed, and only code for module one is shown in window 501. As will be appreciated, by hiding code that is associated with module two and module three, a user may quickly review only those lines of code that relate to module one. In one embodiment, a line 530 may be shown to indicate that lines of code are hidden there. As shown above in FIG. 3 and FIG. 4, these lines would normally only be found at boundaries of code relating to different modules.

In another embodiment, any new code that is typed within a highlighted section of code for a particular module may automatically be associated with the same background colour. This would occur, for example, when a new line of code is added between two other lines of code that have an associated background colour. The user may, however, specifically override this automatic function if desired by associating the lines of code with another colour. This would indicate that those lines of code belong to another module or sub-module dealing with another operational task, for example.

Figure 6:
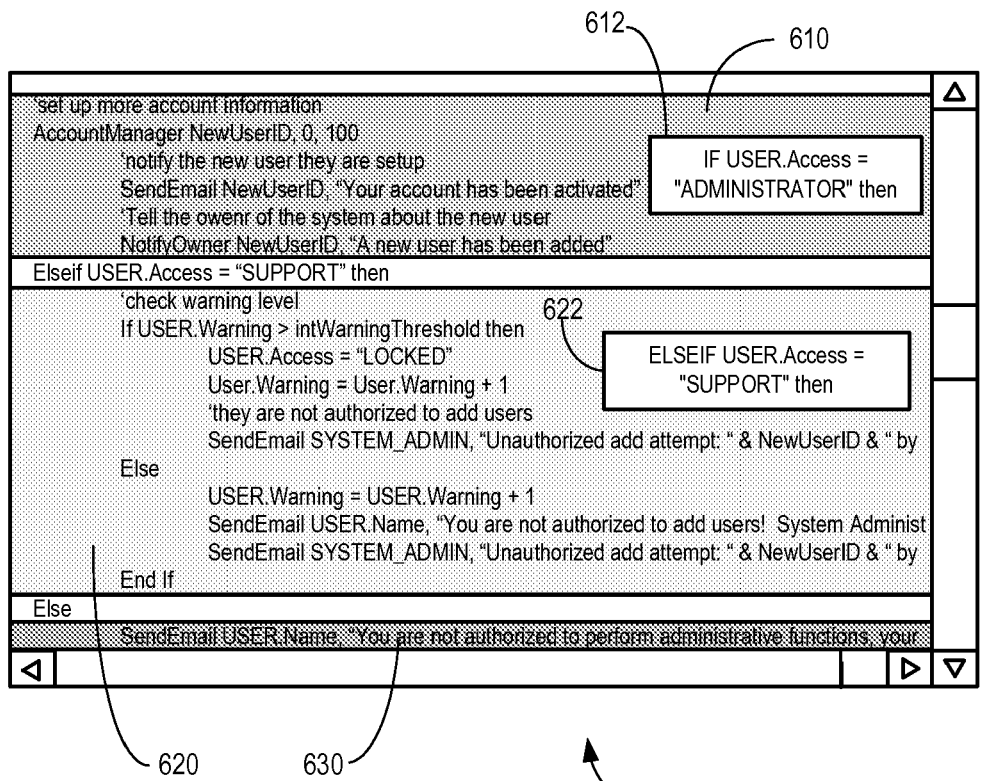

Referring to FIG. 6, a GUI screen 600 shows an illustrative example of how code highlighting may be used within a logical block of code to help the developer know which piece of code is related to which logical section. For example, moving a cursor into a highlighted section 610 may cause a pop-up window 612 to appear which indicates that this section relates to the IF USER.Access="ADMINISTRATOR" then loop. Alternatively, moving the cursor to a highlighted section 620 may cause a pop-up window 622 to appear (and pop-up window 612 to disappear) to indicate that section 620 relates to the ELSEIF USER.Access="SUPPORT" then loop. It will be appreciated that this would allow a developer to know what block of code is being worked on without having to scroll up and down or side to side. This pop-up window function may be continuously active, or only active in combination with another key such as a "Location?" key (not shown).

Figure 7:
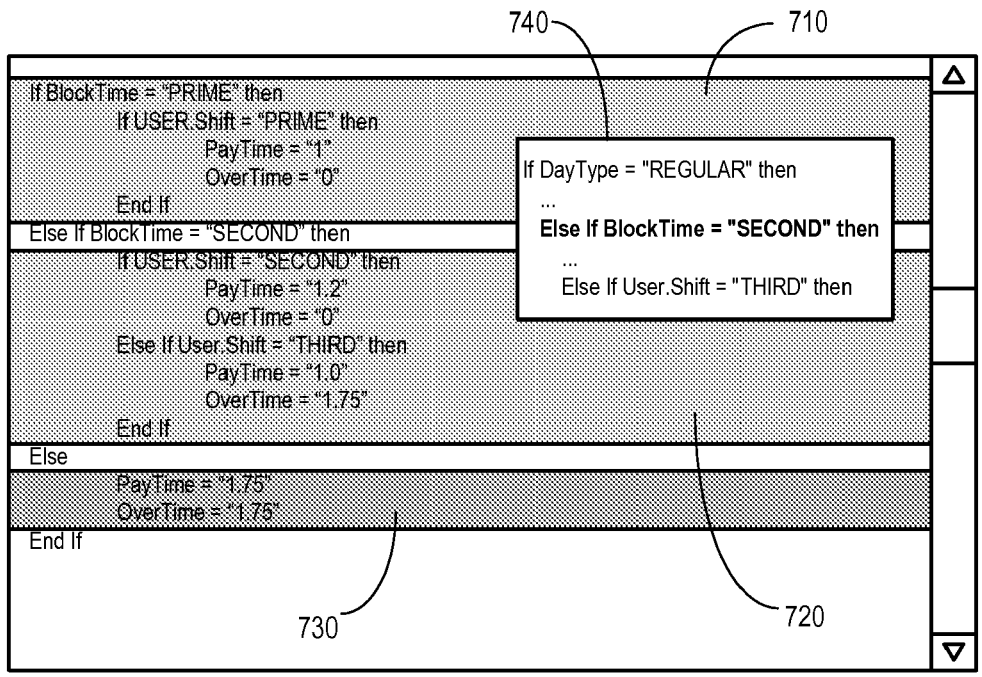

Referring to FIG. 7, a GUI screen 700 shows yet another illustrative embodiment in which a pop-up window 740 may provide information on the nested location of the highlighted section relative to other sections in the code. By way of example, pop-up window 740 may indicate that section 720 (Else If BlockTime="SECOND" then) is nested within another higher level loop (If DayType="REGULAR" then) and also includes a sub-loop (Else If User.Shift="THIRD" then). Again, the developer will be able to identify a location in the code without having to scroll up or down or side to side.

Figure 8:
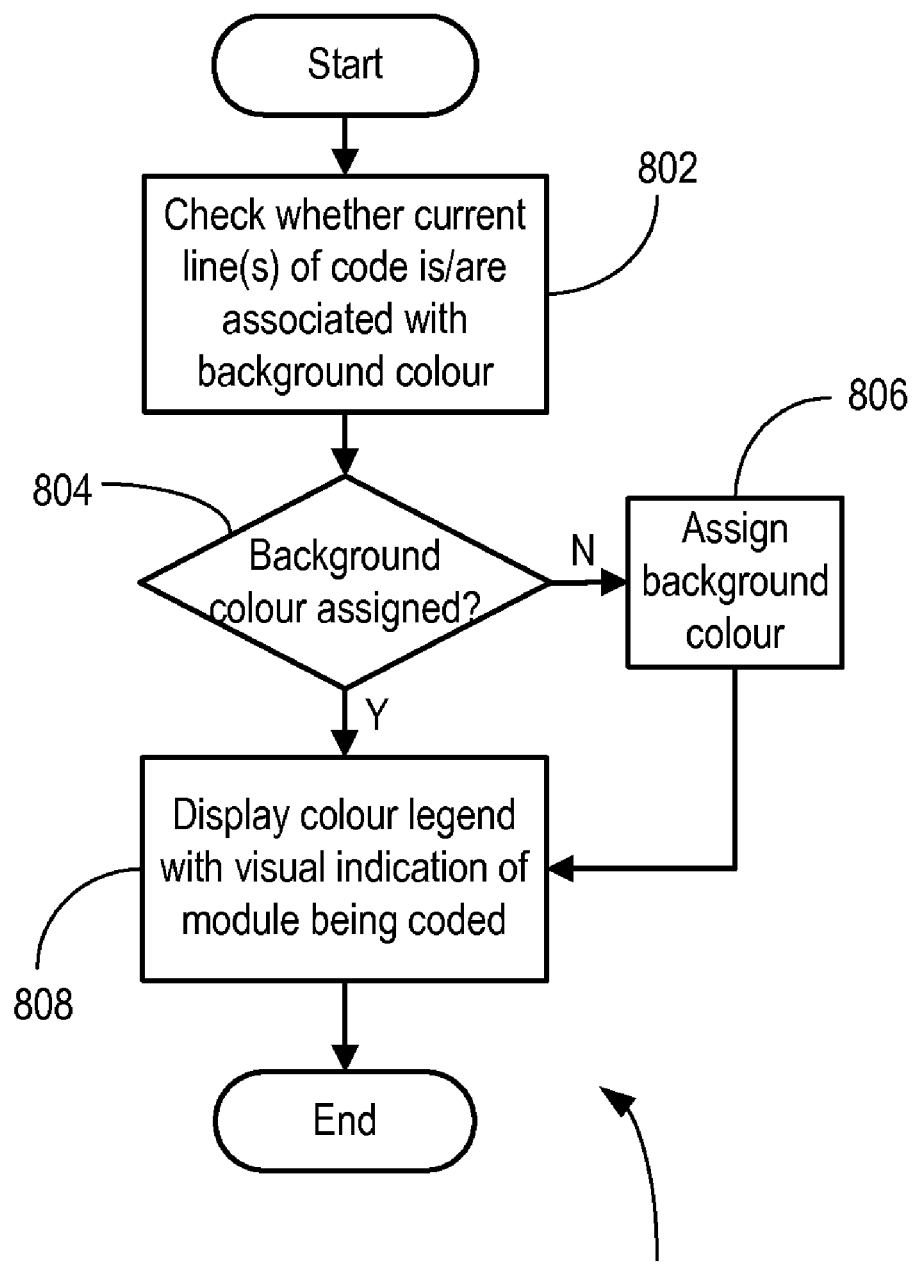
FIG. 8 shows a flowchart of a method in accordance with an embodiment of the invention.

FIG. 8 shows a flowchart of a method 800 in accordance with yet another embodiment of the invention. At block 802, method 800 checks to see whether the currently selected line(s) of code is/are associated with a background colour. This may occur, for example, when the user has just started coding and has not previously assigned any background colours, or has decided to define a new colour for a new module after having already assigned background colours to other modules.

From block 802, method 800 proceeds to a decision block 804 where the method determines whether a background colour has been assigned. If yes, method 800 proceeds directly to a block 808. If no, method 800 proceeds to a block 806 where the user is prompted to assign a background colour. Method 806 then proceeds to a block 808 where a colour legend is displayed. Method 800 then ends.

Figure 9:
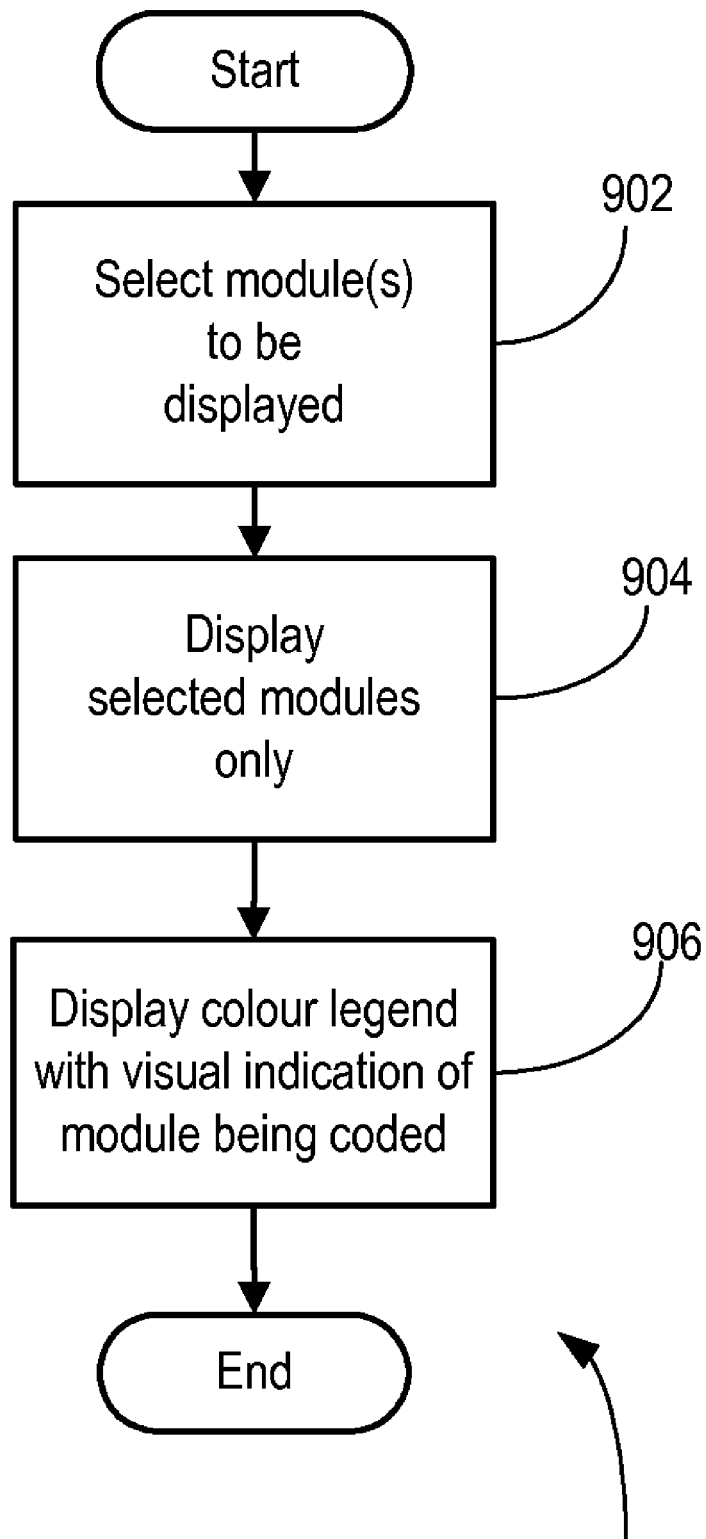
FIG. 9 shows a flowchart of another method in accordance with an embodiment of the invention.

FIG. 9 shows another illustrative method 900 in accordance with another embodiment of the invention. Method 900 begins at a block 902 where, from a list of available modules, a user may select the module(s) to be displayed. This was shown and described above with reference to FIG. 4. Upon making the selection, at a block 904, method 900 displays the selected modules only. This was shown and described above with reference to FIG. 5. At a block 906, method 900 may display a legend to indicate which module is presently being shown. Method 900 then ends.

It will be appreciated that by logically associating certain code modules, logic blocks, or sections or segments of code with a particular background colour, it will be easier for a user to keep track of a current location in a lengthy piece of code. In case a user prefers not to see the background colours all the time, the background colours may be hidden from view and displayed again using a toggle switch or button when the user needs to identify the present location in the code.

As well, it will be appreciated that alternatives to a colour legend may be used. For example, based on the location of the user's cursor on a particular line of code, a pop-up label may appear, and change automatically when the cursor is placed on a line with a different background colour. In an embodiment, this label may be configured to be editable by a user so that the user may add a comment. This label may be attached to an entire module.

In an embodiment, the label may be automatically filled with the beginning of the first line of code in the module, so that the module is readily identified. Whenever the user places a cursor in the module, the label and/or a comment may appear to remind the user of the location in the body of the code.

In another embodiment, where lines of code are to be moved from one module to another module, the background colour of those lines of code may be changed to adopt the colour of the new module. Alternatively, the user may choose to keep the existing background colour in order to put a break in the contiguous colour of the new module.

In another embodiment, the user may be given the ability to switch to an automatic colour assignment mode which would allow the development shell to assign a new colour whenever a new section or module is started. This would help speed up coding using code highlighting as well as ensure that the user does not select a colour already used.

In another embodiment, automatic colour assignment may be used when creating certain objects (e.g. boxes, command buttons, etc.) and routines (e.g. modules, subroutines). The user may select an option that would highlight all references to a particular object or routine in the same colour.

The aspects of the present invention can take the form of an entirely hardware embodiment, an entirely software embodiment or an embodiment containing both hardware and software elements. In a preferred embodiment, the aspect of the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices including, but not limited to, keyboards, displays, pointing devices, etc. can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of an aspect of the present invention has been presented for purposes of illustration and description, and is not intended to be exhaustive or limited to the aspects of the invention in the form disclosed. Many modifications and variations will be apparent to those of ordinary skill in the art. The embodiment was chosen and described in order to best explain the principles of the aspects of the invention, the practical application, and to enable others of ordinary skill in the art to understand the aspects of the invention for various embodiments with various modifications as are suited to the particular use contemplated.

Thus, the scope of the invention is defined by the following claims.

What is claimed is:

1. A method for aiding programmers in identifying a location in a computer program while coding, said method comprising:
    a processor of a computer system receiving information from a user during said coding, wherein said information identifies a plurality of user-delineated code modules, wherein said plurality of user-delineated code modules comprises said computer program, wherein said computer program comprises a plurality of operational tasks, and wherein every said user-delineated code module is part of one operational task of said plurality of operational tasks;
    said processor receiving further information from said user during said coding, wherein said further information associates each code module of said plurality of user-delineated code modules with a module color of a plurality of user-chosen associated background colors, wherein each module of all modules of said user-delineated code modules that share a common operational task of said plurality of operational tasks is associated with an associated task color of said plurality of user-chosen associated background colors, and wherein at least two of said associated task colors are distinct; and
    said processor displaying during said coding a displayed module of said plurality of user-delineated code modules against an associated task color of said plurality of user-chosen associated background colors that has been associated with said displayed module.

2. The method of claim 1, said method further comprising:
    said processor providing a user-selectable module-viewing control; and
    upon selection by the user, using said user-selectable module-viewing control while coding, of a selected module of said plurality of user-delineated code modules, wherein said selected module is part of a selected task of said plurality of operational tasks, said processor displaying all modules of said plurality of user-delineated code modules that share said selected task against an associated task color of said plurality of user-chosen associated background colors that is associated with said selected task.

3. The method of claim 2, said method further comprising:
    said processor relating a described module of said plurality of user-delineated code modules with a related text description; and
    said processor displaying said related text description in response to a user, using said user-selectable module-viewing control while coding, selecting said described module.

4. The method of claim 3, wherein said related text description comprises identifying text that identifies said described module, wherein said, method further comprises said processor displaying sat least one additional identifying block of text, and wherein each said additional identifying block of text identifies at least one additionally identified module of said plurality of user-delineated code modules and provides information on a nested location of said described module relative to said at least one additionally identified module.

5. The method of claim 1, wherein each operational task of said plurality of operational tasks comprises a logical block of code in said computer program.

6. The method of claim 1, wherein each operational task of said plurality of operational tasks comprises source code in said computer program residing at a same hierarchical level.

7. A computer system comprising a processor, a memory coupled to said processor, and a computer-readable hardware storage device coupled to said processor, said storage device containing computer-readable code configured to be executed by said processor via said memory to implement a method for aiding programmers in identifying a location in a computer program while coding, said method comprising:

said processor receiving information from a user during said coding, wherein said information identifies a plurality of user-delineated code modules, wherein said plurality of user-delineated code modules comprises said computer program, wherein said computer program comprises a plurality of operational tasks, and wherein every said user-delineated code module is part of one operational task of said plurality of operational tasks;

said processor receiving further information from said user during said coding, wherein said further information associates each code module of said plurality of user-delineated code modules with a module color of a plurality of user-chosen associated background colors, wherein each module of all modules of said user-delineated code modules that share a common operational task of said plurality of operational tasks is associated with an associated task color of said plurality of user-chosen associated background colors, and wherein at least two of said associated task colors are distinct; and said processor displaying during said coding a displayed module of said plurality of user-delineated code modules against an associated task color of said plurality of user-chosen associated background colors that has been associated with said displayed module.

8. The system of claim 7, further comprising:

said processor providing a user-selectable module-viewing control; and upon selection by the user, using said user-selectable module-viewing control while coding, of a selected module of said plurality of user-delineated code modules, wherein said selected module is part of a selected task of said plurality of operational tasks, said processor displaying all modules of said plurality of user-delineated code modules that share said selected task against an associated task color of said plurality of user-chosen associated background colors that is associated with said selected task.

9. The system of claim 8, further comprising:

said processor relating a described module of said plurality of user-delineated code modules with a related text description; and said processor displaying said related text description in response to a user, using said user-selectable module-viewing control while coding, selecting said described module.

10. The system of claim 9, wherein said related text description comprises identifying text that identifies said described module, wherein said method further comprises said processor displaying at least one additional identifying block of text, and wherein each said additional identifying block of text identifies at least one additionally identified module of said plurality of user-delineated code modules and provides information on a nested location of said described module relative to said at least one additionally identified module.

11. The method of claim 7, wherein each operational task of said plurality of operational tasks comprises a logical block of code in said computer program.

12. The method of claim 7, wherein each operational task of said plurality of operational tasks comprises source code in said computer program residing at a same hierarchical level.

13. A computer program product, comprising a computer readable hardware storage device having computer readable code stored therein, said code containing instructions configured to be executed by a processor of a computer system to implement a method for identifying a location in a computer program while coding, said method comprising:

said processor receiving information from a user during said coding, wherein said information identifies a plurality of user-delineated code modules, wherein said plurality of user-delineated code modules comprises said computer program, wherein said computer program comprises a plurality of operational tasks, and wherein every said user-delineated code module is part of one operational task of said plurality of operational tasks;

said processor receiving further information from said user during said coding, wherein said further information associates each code module of said plurality of user-delineated code modules with a module color of a plurality of user-chosen associated background colors, wherein each module of all modules of said user-delineated code modules that share a common operational task of said plurality of operational tasks is associated with an associated task color of said plurality of user-chosen associated background colors, and wherein at least two of said associated task colors are distinct; and said processor displaying during said coding a displayed module of said plurality of user-delineated code modules against an associated task color of said plurality of user-chosen associated background colors that has been associated with said displayed module.

14. The computer program product of claim 13, further comprising:

said processor providing a user-selectable module-viewing control; and upon selection by the user, using said user-selectable module-viewing control while coding, of a selected module of said plurality of user-delineated code modules, wherein said selected module is part of a selected task of said plurality of operational tasks, said processor displaying all modules of said plurality of user-delineated code modules that share said selected task against an associated task color of said plurality of user-chosen associated background colors that is associated with said selected task.

15. The computer program product of claim 14, further comprising:

said processor relating a described module of said plurality of user-delineated code modules with a related text description; and said processor displaying said related text description in response to a user, using said user-selectable module-viewing control while coding, selecting said described module.

16. The computer program product of claim 15, wherein said related text description comprises identifying text that identifies said described module, wherein said method further comprises said processor displaying at least one additional identifying block of text, and wherein each said additional identifying block of text identifies at least one additionally identified module of said plurality of user-delineated code modules and provides information on a nested location of said described module relative to said at least one additionally identified module.

17. The method of claim 13, wherein each operational task of said plurality of operational tasks comprises source code in said computer program residing at a same hierarchical level.

* * * * *